United States Patent
Lim et al.

(10) Patent No.: US 9,143,971 B2
(45) Date of Patent: Sep. 22, 2015

(54) APPARATUS AND METHOD FOR ESTIMATING A LOCATION OF A MOBILE STATION IN A WIRELESS LOCAL AREA NETWORK

(71) Applicant: LG ELECTRONICS INC., Seoul (KR)

(72) Inventors: Dongguk Lim, Anyang-si (KR); Dongcheol Kim, Anyang-si (KR); Jiwoong Jang, Anyang-si (KR); Hangyu Cho, Anyang-si (KR); Jiwon Kang, Anyang-si (KR); Sungho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 214 days.

(21) Appl. No.: 13/868,870

(22) Filed: Apr. 23, 2013

(65) Prior Publication Data

US 2013/0294266 A1 Nov. 7, 2013

Related U.S. Application Data

(60) Provisional application No. 61/637,242, filed on Apr. 23, 2012.

(30) Foreign Application Priority Data

Apr. 23, 2013 (KR) .................. 10-2013-0044787

(51) Int. Cl.
*H04W 24/10* (2009.01)
*H04W 64/00* (2009.01)
*H04W 84/12* (2009.01)
*G01S 5/06* (2006.01)

(52) U.S. Cl.
CPC ............... *H04W 24/10* (2013.01); *G01S 5/06* (2013.01); *H04W 64/00* (2013.01); *H04W 84/12* (2013.01)

(58) Field of Classification Search
CPC ....... H04W 4/02; H04W 4/023; H04W 4/025; H04W 84/12; H04W 24/10; H04W 64/00; G01S 5/06
See application file for complete search history.

(56) References Cited

U.S. PATENT DOCUMENTS

| 2008/0183384 | A1* | 7/2008 | Gaal et al. ..................... 701/213 |
| 2009/0066564 | A1* | 3/2009 | Burroughs et al. ......... 342/357.1 |
| 2010/0004003 | A1* | 1/2010 | Duggal et al. ............. 455/456.3 |
| 2010/0112989 | A1* | 5/2010 | Andreasson ............... 455/414.2 |
| 2013/0165157 | A1* | 6/2013 | Mapes ....................... 455/456.5 |

* cited by examiner

*Primary Examiner* — Jianye Wu
(74) *Attorney, Agent, or Firm* — Lee, Hong, Degerman, Kang & Waimey (57) ABSTRACT

A method for estimating a location of a mobile station includes transmitting a position request signal, including at least departure time information or an identifier of the mobile station, to an AP by synchronizing with the AP, receiving first position information, including at least a calculated first location of the mobile station or a calculated first distance between the mobile station and the AP and departure time information of a position response signal, from the AP, calculating a ToA of a signal between the mobile station and the AP based on the departure time information of the position response signal, calculating at least a second distance between the mobile station and the AP or a second location of the mobile station using the ToA, and determining a final location of the mobile station based on the first position information and at least the second distance or the second location.

14 Claims, 6 Drawing Sheets

APPARATUS AND METHOD FOR ESTIMATING A LOCATION OF A MOBILE STATION IN A WIRELESS LOCAL AREA NETWORK

CROSS-REFERENCE TO RELATED APPLICATIONS

Pursuant to 35 U.S.C. §119, this application claims the benefit of earlier filing date and right of priority to Korean Application No. 10-2013-0044787, filed on Apr. 23, 2013, and also claims the benefit of U.S. Provisional Application Ser. No. 61/637,242, filed on Apr. 23, 2012, the contents of which are all hereby incorporated by reference herein in their entirety.

BACKGROUND OF THE INVENTION

1. Field of the Invention

The present invention relates to a wireless communication, and more particularly, to an apparatus and method for estimating a location of a mobile station in a wireless local area network.

2. Discussion of the Related Art

In a wired LAN environment, detection of collision can be obtained from a potential variation of a transmitting medium. Yet, in a wireless LAN environment, it is difficult to detect collision on a transmitting medium (e.g., air, etc.). Hence, a multiple access scheme for a wireless transmission by avoiding collision in advance is called CSMA/CA (carrier sense multiple access with collision avoidance) that is a medium access control scheme used by CSMA/CA wireless LAN. The collision avoidance means the algorithm including the steps of if a circuit is vacant before transmitting data of its own, creating random numbers and then waiting by the corresponding value. A transmission is initiated only if a transmission medium is determined as not in use after a randomized standby time.

By MAC algorithm generally used by wireless LAN, a signal for acknowledgment is transmitted to prepare for a collision despite an absence of a data transmission. If it is confirmed that the acknowledgement signal has been transmitted without collision, data is then sent. In IEEE 802.11 standard, a procedure called ACK or CTS/RTS is used. In doing so, an operating principle of CSMA/CA is explained as follows.

First of all, a transmitting end sends an RTS (request to send) signal to a receiving end. In response to the RTS signal, the receiving end sends a CTS (clear to send) signal to the transmitting end. The transmitting end sends data to the receiving end. Finally, the receiving end sends an ACK signal to the transmitting end in response to the data reception.

The collision avoidance scheme in IEEE 802.11 standard is schematically described as follows.

IFS (Inter Frame Space)

First of all, although it is confirmed that a channel is in an idle state, collision is avoided by delaying a transmission. The transmission is not performed right after the channel in the idle state has been found. Instead, it is necessary to wait by prescribed duration called IFS. This is because a remote station may have begun a transmission despite that a detected channel looks as if staying in the idle state. In this case, if the transmission is performed without waiting, a collision may occur. Hence, it is necessary to wait during the IFS. Moreover, in CSMA/CA, IFS may be used to regulate a priority of a station or frame. In IEEE 802.11 standard, such an IFS as DIFS (Distributed IFS), PIFS (PCF IFS), SIFS (Short IFS), EIFS (Extended IFS) and the like is used.

A mobile station, which operates using the CSMA/CA scheme, performs a following procedure to transmit data. First of all, a mobile station A senses a carrier to check whether a mobile station B is transceiving data (i.e., whether the mobile station B is transmitting electric waves). If the mobile station A is aware that the mobile station is transceiving the data, the mobile station A waits until DIFS becomes vacant. In the vacant state, the mobile station A waits for randomly determined duration. If the vacant state continues, the mobile station A starts a transmission.

Contention Window

A contention window is a predetermined time divided into time slots. A station ready for a transmission selects a random number and then waits for the selected random number. In this interval, the station detects a channel after each time slot. In doing so, if the station detects that a channel is already in use, the station just stops a timer instead of restarting the corresponding process. Thereafter, if it is detected that the channel is in an idle state, the station activates the timer again. Therefore, a station having waited for the longest time has a priority.

However, in the current IEEE 802.11 standard mentioned in the above description, a detailed method of measuring a location of a mobile station in Wireless LAN has not been proposed. Thus, the demand for a detailed method for a WLAN using mobile station to estimate position information rises and the present invention intends to propose the corresponding method.

SUMMARY OF THE INVENTION

Accordingly, embodiments of the present invention are directed to an apparatus and method for estimating a location of a mobile station in a wireless local area network that substantially obviate one or more problems due to limitations and disadvantages of the related art.

One object of the present invention is to provide a method of estimating a location of a mobile station in a wireless local area network (LAN) according to one embodiment of the present invention.

Another object of the present invention is to provide a method of estimating a location of a mobile station in a wireless local area network (LAN) according to another embodiment of the present invention.

Another object of the present invention is to provide a method of estimating a location of a mobile station in a wireless local area network (LAN) according to a further embodiment of the present invention.

Another object of the present invention is to provide a mobile station for estimating a location in a wireless local area network (LAN) according to one embodiment of the present invention.

Another object of the present invention is to provide a mobile station for estimating a location in a wireless local area network (LAN) according to another embodiment of the present invention.

Another object of the present invention is to provide a mobile station for estimating a location in a wireless local area network (LAN) according to a further embodiment of the present invention.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a method of estimating a location of a mobile station in a wireless LAN (local area network), according to one embodiment of the present invention may include the steps of transmitting a position request signal including at least one of departure time information of the position request signal and an identifier of the mobile station to an AP (access point) by synchronizing with the AP, receiving first position information including at least one of a calculated $1^{st}$ location of the mobile station and a calculated first distance between the mobile station and the AP and departure time information of a position response signal from the AP in response to a transmission of the position request signal, calculating a ToA (time of arrival) of a signal between the mobile station and the AP based on the received departure time information of the position response signal, calculating at least one of a second distance between the mobile station and the AP and a second location of the mobile station using the calculated ToA, and determining a final location of the mobile station based on the first position information and at least the second distance or the second location of the mobile station.

Preferably, the method may further include the step of receiving a beacon frame from the AP, wherein the beacon frame may include timestamp information and wherein the synchronization with the AP may be matched based on the timestamp information. Preferably, the position request signal may further include at least one of a position request indicator, a time offset information and a neighbor AP information. Preferably, the position request signal corresponds to a probe-request message type and the position response signal corresponds to a probe-response message type. Preferably, the calculated first location of the mobile station and the calculated first distance between the mobile station and the AP may be calculated by a location server or a gateway. More preferably, the calculated first location of the mobile station and the calculated first distance between the mobile station and the AP may be calculated using a ToA value measured by the AP based on the position request signal of the mobile station.

In another aspect of the present invention, a method of estimating a location of a mobile station in a wireless LAN (local area network), according to another embodiment of the present invention may include the steps of receiving a position request signal from an AP (access point) after synchronizing with the AP, calculating a ToA (time of arrival) of a signal between the mobile station and the AP based on a departure time included in the position request signal, calculating at least one of a first location of the mobile station and a first distance between the mobile station and the AP based on the calculated ToA, transmitting a position response signal including first position information including the calculated ToA, at least one of the first location of the mobile station and the first distance and departure time information of the position response signal to the AP. And receiving second position information including a second location of the mobile station from the AP. Preferably, the second location of the mobile station may be calculated by a location server or a gateway. More preferably, the second location of the mobile station may be calculated using the ToA re-calculated by the AP based on the calculated ToA.

In another aspect of the present invention, a method of estimating a location of a mobile station in a wireless LAN (local area network), according to a further embodiment of the present invention may include the steps of transmitting a position request signal to an AP (access point) after synchronizing with the AP, receiving a position response signal including departure time information of the position response signal from the AP in response to the position request signal, calculating a ToA (time of arrival) of a signal between the mobile station and the AP based on a departure time of the position response signal, calculating at least one of a first location of the mobile station and a first distance between the mobile station and the AP based on the calculated ToA, transmitting first position information including the calculated ToA, at least one of the first location of the mobile station and the first distance to the AP, and receiving second position information including a second location of the mobile station from the AP.

In another aspect of the present invention, a mobile station of estimating a location in a wireless LAN (local area network), according to one embodiment of the present invention may include a transmitter configured to transmit a position request signal including at least one of departure time information of the position request signal and an identifier of the mobile station to an AP (access point) by synchronizing with the AP, a receiver configured to receive first position information including at least one of a calculated first location of the mobile station and a calculated first distance between the mobile station and the AP and departure time information of a position response signal from the AP in response to the transmission of the position request signal, and a processor configured to calculate a ToA (time of arrival) of a signal between the mobile station and the AP based on the received departure time information of the position response signal, the processor configured to calculate at least one of a second distance between the mobile station and the AP and a second location of the mobile station using the calculated ToA, the processor configured to determine a final location of the mobile station based on the first position information and at least one the second distance or the $2^{nd}$ location of the mobile station.

In another aspect of the present invention, a mobile station of estimating a location in a wireless LAN (local area network), according to another embodiment of the present invention may include a receiver configured to receive a position request signal from an AP (access point) after synchronizing with the AP, a processor configured to calculate a ToA (time of arrival) of a signal between the mobile station and the AP based on a departure time included in the position request signal, the processor configured to calculate at least one of a first location of the mobile station and a first distance between the mobile station and the AP based on the calculated ToA, and a transmitter configured to transmit a position response signal including a $1^{st}$ position information including the calculated ToA, at least one of the first location of the mobile station and the first distance, and departure time information of the position response signal to the AP, wherein the receiver may receive second position information including a second location of the mobile station from the AP.

In a further aspect of the present invention, a mobile station of estimating a location in a wireless LAN (local area network), according to a further embodiment of the present invention may include a transmitter configured to transmit a position request signal to an AP (access point) after synchronizing with the AP, a receiver configured to receive a position response signal including departure time information of the position response signal from the AP in response to the position request signal, and a processor configured to calculate a ToA (time of arrival) of a signal between the mobile station and the AP based on a departure time of the position response signal, the processor configured to calculate at least one of a first location of the mobile station and a first distance between the mobile station and the AP based on the calculated ToA, wherein the transmitter may be configured to further transmit first position information including the calculated ToA, at least one the first location of the mobile station or the first distance to the AP, and wherein the receiver may be configured to further receive second position information including a second location of the mobile station from the AP.

Accordingly, the present invention provides the following effects and/or advantages.

First of all, according to embodiments of the present invention, a mobile station using WLAN transmits time information via a frame and signal transceived between an access point (AP) and the mobile station in order to estimate a position information, thereby raising location estimation accuracy of the mobile station through accurate ToA information estimation and repetitive measurements.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP ($3^{rd}$ generation partnership project) LTE/LTE-A system, they are applicable to other random mobile communication systems except unique features of 3GPP LTE/LTE-A.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal or device is a common name of such a mobile or fixed user stage device as a user equipment (UE), a mobile station (MS), an advanced mobile station (AMS), and the like. And, assume that a base station is a common name of such a random node of a network stage communicating with a terminal as a Node B, an eNode B, a base station (BS), an access point (AP) and the like. Although the description of this specification is based on IEEE 802.16 system, the contents and technical idea of the present invention are applicable to various kinds of other communication systems.

In a mobile communication system, a mobile station (or device) can receive information in downlink from a base station and transmit information in uplink to the base station. The informations transmitted or received by the mobile station may include data and various control informations. And, various kinds of physical channels may exist in accordance with types and usages of the informations transmitted or received by the mobile station.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

Specific terminologies used for the following description may be provided to help the understanding of the present invention. And, the use of the specific terminology may be modified into another form within the scope of the technical idea of the present invention.

Figure 1:
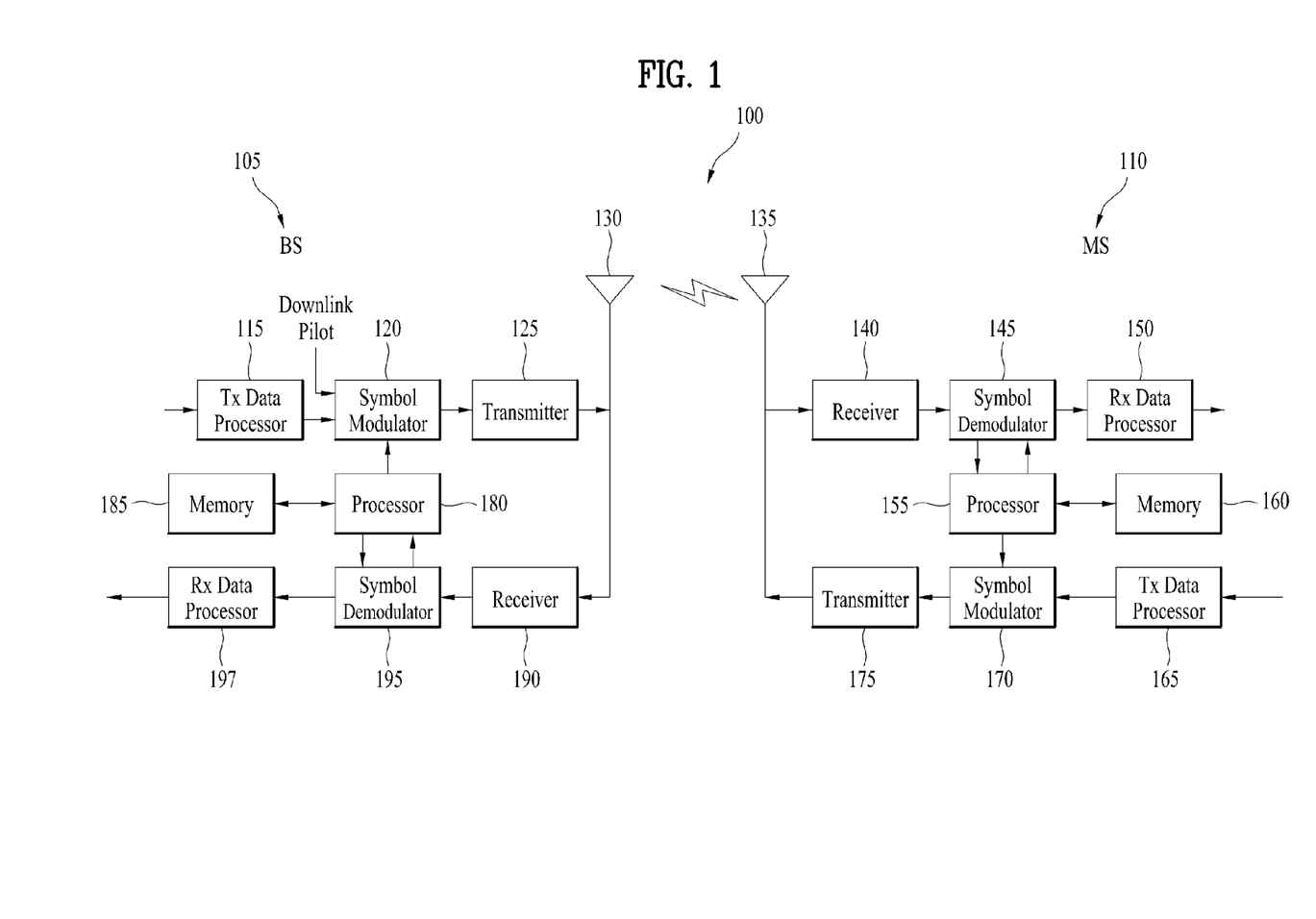
FIG. 1 is a block diagram for configurations of a base station 105 and a mobile station 110 in a wireless communication system 100.

FIG. 1 is a block diagram for configurations of a base station 105 and a mobile station 110 in a wireless communication system 100.

Although one base station 105 and one mobile station 110 are shown in the drawing to schematically illustrate a wireless communication system 100, the wireless communication system 100 can include at least one base station and/or at least one mobile station.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a mobile station 110 may include a transmitted (Tx) data processor 165, a symbol modulator 175, a transmitter 175, a transceiving antenna 135, a processor 155, a memory 160, a receiver 140, a symbol demodulator 155 and a received data processor 150. Although the base station/mobile station 105/110 includes one antenna 130/135 shown in the drawing, each of the base station 105 and the mobile station 110 includes a plurality of antennas. Therefore, each of the base station 105 and the mobile station 110 according to the present invention supports an MIMO (multiple input multiple output) system. And, the base station 105 according to the present invention can support both SU-MIMO (single user-MIMO) and MU-MIMO (multi user-MIMO) systems.

In downlink, the transmitted data processor 115 receives traffic data, performs coding on the received traffic data by formatting, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero (i.e., null). In each symbol duration, pilot symbols may be contiguously transmitted. In doing so, the pilot symbols may include symbols of frequency division multiplexing (FDM), orthogonal frequency division multiplexing (OFDM), time division multiplexing (CDM), or code division multiplexing (CDM).

The transmitter 125 receives the stream of the symbols, converts the received stream to at least one or more analog signals, additionally adjusts the analog signals (e.g., amplification, filtering, frequency upconverting, etc.), and then generates a downlink signal suitable for a transmission on a radio channel. Subsequently, the downlink signal is transmitted to the mobile station 110 via the transmitting antenna 130.

In the configuration of the mobile station 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, obtains data symbol estimated values (i.e., estimated values of the transmitted data symbols) by performing data demodulation on the received data symbols, and then provides the data symbol estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

Regarding the mobile station 110 in uplink, the transmitted data processor 165 provides data symbols by processing the traffic data. The symbol modulator 170 provides a stream of symbols to the transmitter 175 by receiving the data symbols, multiplexing the received data symbols, and then performing modulation on the multiplexed symbols. The transmitter 175 generates an uplink signal by receiving the stream of the symbols and then processing the received stream. The generated uplink signal is then transmitted to the base station 105 via the transmitting antenna 135.

In the base station 105, the uplink signal is received from the mobile station 110 via the receiving antenna 130. The receiver 190 obtains samples by processing the received uplink signal. Subsequently, the symbol demodulator 195 provides pilot symbols received in uplink and a data symbol estimated value by processing the obtained samples. The received data processor 197 reconstructs the traffic data transmitted from the mobile station 110 by processing the data symbol estimated value.

The processor 155/180 of the mobile station/base station 110/105 directs operations (e.g., control, adjustment, management, etc.) of the mobile station/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with one of ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio interface protocol between a mobile station and a base station can be classified into $1^{st}$ layer (L1), $2^{nd}$ layer (L2) and $3^{rd}$ layer (L3) based on 3 lower layers of OSI (open system interconnection) model well known to communication systems. A physical layer belongs to the $1^{st}$ layer and provides an information transfer service via a physical channel. RRC (radio resource control) layer belongs to the $3^{rd}$ layer and provides control radio resources between UE and network. A mobile station and a base station may be able to exchange RRC messages with each other via a radio communication network using RRC layers.

In the present specification, the processor 155 of the mobile station 110 performs operations of processing signals and data except signal transceiving and storing functions of the mobile station 110. And, the processor 180 of the base station 105 performs operations of processing signals and data except signal transceiving and storing functions of the base station 105. Yet, for clarity, the processors 155 and 180 are not specially mentioned in the following description. Therefore, the processor 155 can perform a series of operations such as a data processing and the like other than the signal transceiving and storing functions, which may not be specially mentioned in the following description.

Figure 2:
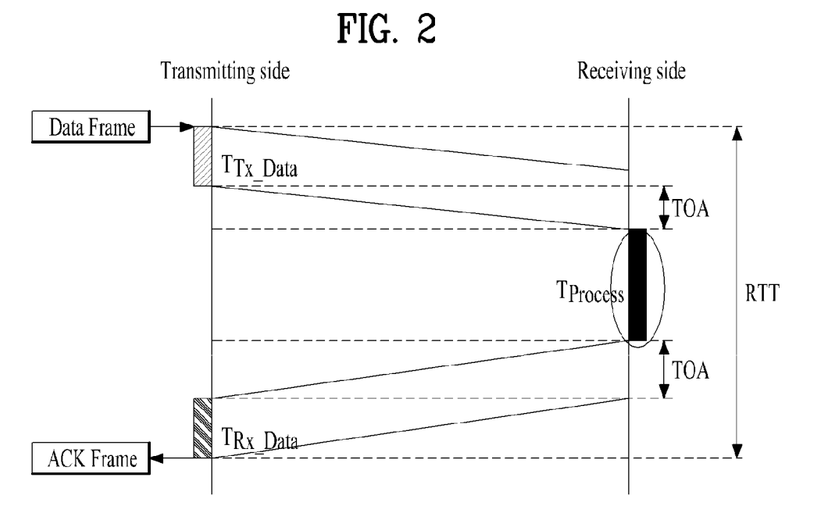
FIG. 2 is a diagram for one example to describe the concept of RTT (round trip time) and TOA (time of arrival)

FIG. 2 is a diagram for one example to describe the concept of RTT (round trip time) and TOA (time of arrival).

Referring to FIG. 2, RTT indicates a time taken for a response signal, after a packet transmitted from a transmitting side has been forwarded to a receiving side via a random number of intermediate connection ports or a communication network, to arrive at a transmitting side via a multitude of intermediate connection ports or the communication network. And, TOA can be found by Formula 1 through the RTT measured in the above manner. The TOA means a time taken for a signal transmitted from a transmitting side to arrive at a receiving side.

$$TOA=(RTT-t_{Tx\text{-}DATA}-t_{Rx\text{-}DATA}-t_{Process})/2 \quad \text{[Formula 1]}$$

In Formula 1, the $t_{Process}$ indicates a time taken to process a received signal.

A mobile station can calculate TOA through RTT and is then able to obtain a distance between the mobile station and an access point (AP) using the calculated TOA. And, the user equipment can obtain its position using TOA measured from at least 3 base stations.

Alternatively, unlike FIG. 2, RTT can be measured through transmission and reception of RTS/CTS frame.

Since a procedure for measuring RTT is not defined in IEEE 802.11 system, it is difficult to measure an accurate RTT. And, an error of RTT may be generated from a time delay due to a processing time. Thus, in case that a position is estimated with TOA obtained from RTT, it may cause a problem that a considerable estimated position error is generated. In order to solve this problem, proposed in the following is a method of estimating a position of a mobile station in a wireless LAN (local area network) by step-by-step ToA and TDoA (time difference of arrival) estimation through maintaining a synchronization between an access point (AP) and the mobile station and a synchronization between access points. And, a signaling transmission scheme is proposed to increase accuracy in estimating a position of a mobile station in CSMA (carrier sense multiple access) based WiFi system.

In order to accurately estimate a position of a mobile station in a wireless LAN, it is necessary to accurately measure a distance between an access point (AP) and the mobile station. In doing so, in order to calculate an accurate ToA, it is necessary to match a time synchronization between the access point (AP) and the mobile station and a time synchronization between access points. Generally, in a wireless LAN, an AP periodically transmits a beacon frame. And, a mobile station can match a synchronization with the AP by scanning neighbor APs though the received beacon frame or using information transmitted via the received beacon frame. The information transmitted via the beacon frame transmitted by the AP may include the followings.

Timestamp: Usable for synchronization between an AP and a mobile station and a local clock update of a mobile station Beacon interval information: Target beacon transmission time Capability information: SSID (Service Set Identifier), Supported rate, Frequency-hopping (FH) Parameter Set, Direct-Sequence (DS) Parameter Set, Contention-Free (CF) Parameter Set, IBSS Parameter Set, Traffic indication map (TIM)

A mobile station can maintain a synchronization with an AP (Access Point) using a timestamp value periodically transmitted via a beacon frame by the AP. If the received timestamp value is different from a previous local clock of the mobile station, it is able to match the synchronization with the AP by updating the local clock. Since the beacon frame is transmitted by the AP, the mobile station can receive beacon frames transmitted by other APs located nearby except a serving AP. And, the mobile station can obtain AP information and timestamp information from the received beacon frame. Having obtained the timestamp of the neighbor AP, the mobile station can estimate a time offset between the serving AP and the neighbor AP and then may transmit the estimated time offset information to the serving AP in a manner of pairing or bundling the estimated time offset information with the corresponding AP information. In this case, the time offset may be represented as a difference between the timestamp of the serving AP and the timestamp of the neighbor AP. And, the neighbor AP and time offset information transmitted to the serving AP by the mobile station can be represented as Table 1. In Table 1, the time offset information can be represented by bit or byte unit.

TABLE 1

| AP ID | Time offset |
|-------|-------------|
| xxx   | 3           |
| yyy   | 1           |

Having received the neighbor AP information and the time offset information from the mobile station, the mobile station can use the received information shown in Table 1 to maintain the synchronization with the neighbor AP.

On the other hand, since AP are connected to each other via a gateway or a server by wire, they can share information on the access points with each other in backhaul link and can obtain an inter-AP time difference owing to the AP information sharing. Hence, access points belonging to BSS/EBSS (basic service set/extended basic service set) can maintain the inter-AP synchronization through the information sharing by wire. If a time offset value for a neighbor AP, it is able to accurately obtain times for synchronization maintenance and signal transmission/reception without matching a time with the neighbor AP in direct.

Through a synchronization between a mobile station and an AP and an inter-AP synchronization in a wireless LAN, the mobile station can obtain its position by the step-by-step ToA and TDOA measurements.

Figure 3:
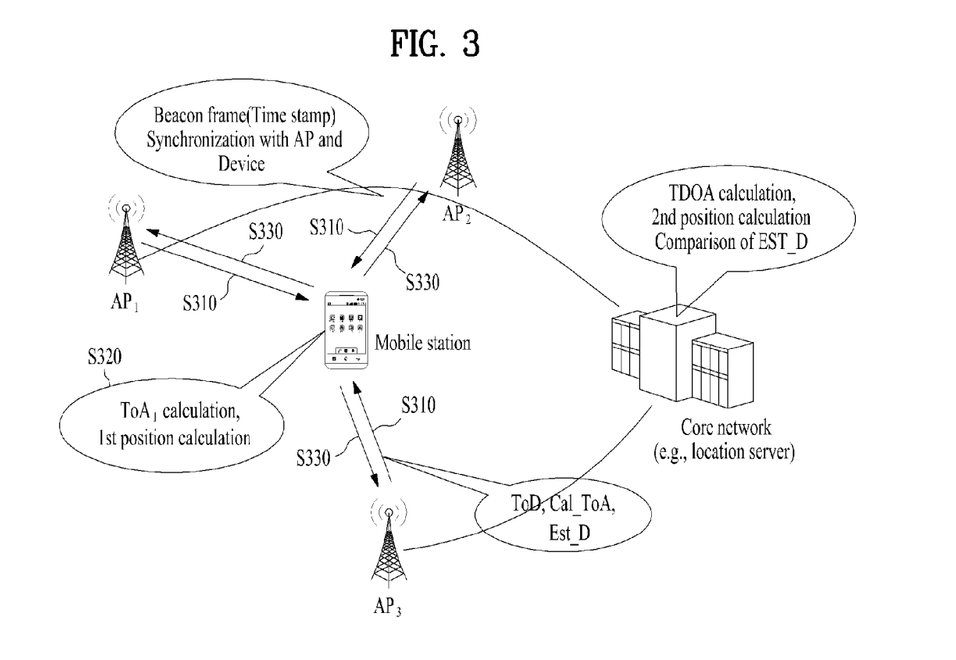
FIG. 3 is a diagram to describe a location estimating method by step-by-step ToA/TDOA measurement though synchronization, in which the concept of a hierarchical positioning method is described.

FIG. 3 is a diagram to describe a location estimating method by step-by-step ToA/TDOA measurements though synchronization, in which the concept of a hierarchical positioning method is described.

Referring to FIG. 3, a mobile station location estimation via a wireless LAN is performed by a following process. First of all, a mobile station receives information on neighbor APs $AP_1$, $AP_2$ and $AP_3$ via a beacon frame for location estimation [S310]. The mobile station obtains the information of the neighbor APs via the beacon frame. In this case, the mobile station synchronizes with the AP via a timestamp transmitted in the beacon subframe and then may measure an inter-AP time offset value [S310].

Having matched the synchronization with the AP, the mobile station primarily performs a location estimation through a calculation of a distance between the AP and the mobile station by measuring ToA between the mobile station and the AP through signals received from the APs [S320]. The calculation of the distance between the mobile station and the neighbor AP can be measured using TDOA in consideration of the measured time offset. Having performed the location estimation through the $1^{st}$ step ToA, the mobile station can transmit the measured 1$^{st}$ position information (e.g., TOA value, 1$^{st}$ position value, etc.) to the AP by broadcasting [S330]. In doing so, the signal transmitted by the mobile station can include such information as ToD (time of departure), first_cal_ToA, first_Est_De and the like.

Having received the 1$^{st}$ position information broadcasted by the mobile station, each of the APs shares the received information with such a server of a core network as a location server (or a gateway) and the like. If so, the location server can measure ToA, TDoA and the like again using the shared 1$^{st}$ position information and the received signal. Subsequently, the AP estimates a 2$^{nd}$ position of the mobile station through a time value measured by sharing the measured ToA and TDoA with the APs. Hence, a position of the mobile station can be finally obtained by a compensation process using the position information (i.e., the 1$^{st}$ position of the mobile station) estimated by the 1$^{st}$ step and the calculated position information of the mobile station (i.e., the 2$^{nd}$ position of the mobile station) in the 2$^{nd}$ step.

The step-by step location estimating method is schematically explained in the above description. And, a step-by-step location estimating method in a wireless LAN shall be described in detail as follows. The step-by step location estimating method can be categorized into a mobile station (device) based step-by step location estimating method and an AP based step-by step location estimating method in accordance with an estimating station. And, the two methods are described as follows.

Mobile Station (Device) Based Step-by-Step Location Estimating Method

Figure 4:
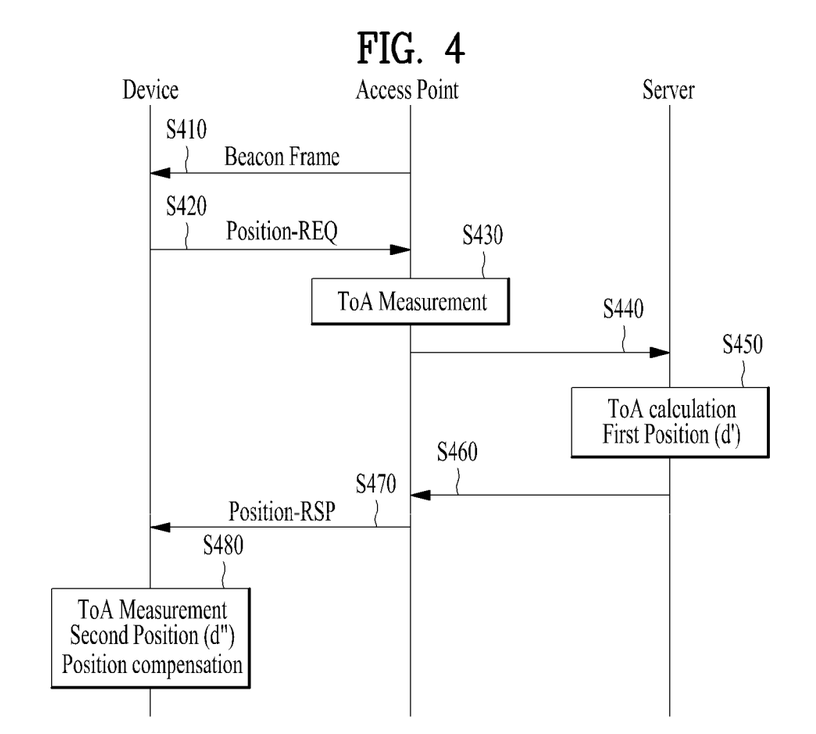
FIG. 4 is a diagram for one example to describe an MS (mobile station) based step-by-step location estimating method.

FIG. 4 is a diagram for one example to describe an MS (mobile station) based step-by-step location estimating method.

Referring to FIG. 4, a mobile station receives a beacon frame from an AP and then synchronizes with the AP (or maintains the synchronization) [S410]. As mentioned in the foregoing description, the mobile statin can check a local clock information through a time stamp included in the beacon frame. If the local clock information is not correct, the mobile station can update a timer [S410].

Having performed the synchronization, the mobile station transmits a position-request signal (e.g., a position-request frame) to the AP in order to estimate its position. In doing so, the signal (or frame) transmitted by the mobile station includes at least one of a position request indicator, departure time information of the transmitted signal (or frame), a time offset information, neighbor AP information, a mobile station ID (device ID) and the like [S420]. In this case, the position-request signal transmitted to the AP by the mobile station can be transmitted via a probe-request signal in IEEE 802.11 standard. And, the mobile station has a timer or a time stamp like the AP. Having received the position-request signal from the mobile station, the AP calculates a ToA between the AP and the mobile station using ToD received via the position-request signal/frame [S430]. In particular, the AP performs 1$^{st}$ step location estimation. Thereafter, the AP having measured the ToA operates in the following two cases.

Case 1

Having estimated the ToA between the mobile station and the AP, the AP(s) can transmit the estimated ToA information to such an upper layer as a position sever, a gateway and the like [S440]. In particular, the AP can transmit distance information calculated on the basis of the measured ToA to the upper location server or the gateway [S440]. In this case, the location server (LCSR) or the gateway calculates a distance between the mobile station and each of the APs based on the received ToA [S450]. This calculation can be named a 1$^{st}$ position measurement and the calculated position of the mobile station can be named a 1$^{st}$ position.

Thereafter, the server transmits a 1$^{st}$ position measured value to a serving AP (i.e., the AP shown in FIG. 4) or transmits position information obtained from the calculated distance information to the serving AP [S460].

Case 2

Like the above-described case 1, the AP having measured the ToA performs a 1$^{st}$ location estimation in a manner of calculating a distance between the AP and the mobile station using the measured ToA informations or performing a location estimation using the calculated distance [S430]. In doing so, each of other APs (i.e., neighbor APs) having received a signal from the mobile station transmits ToA to the serving AP or transmits a result value of the 1$^{st}$ step location estimation to the serving AP.

Having performed the above operation, the AP transmits 1$^{st}$ position information including ToA1 (i.e., ToA value calculated by the 1$^{st}$ location estimation), distance, 1$^{st}$ location of the mobile station and the like to the mobile station via a position-response signal (e.g., position-RSP frame/signal) [S470]. In this case, the position-response signal transmitted by the AP includes information of ToD as well. In this case, the ToD information becomes departure time information of the position-response signal. For instance, the position-response signal including the ToD information can use Probe-RSP frame of IEEE 802.11 standard. Having received the ToD and the 1$^{st}$ position information from the AP, the mobile station calculates a 2$^{nd}$ ToA (ToA2) based on the received ToD [S480]. The mobile station is then able to secondarily calculate a distance between the mobile station and the AP and a location of the mobile station based on the measured ToA2 [S480].

Thus, the mobile station can obtain a location using the ToA, distance and position information measured by the 1$^{st}$ and 2$^{nd}$ steps. The mobile station can obtain the position information by finding the distance between the AP and the mobile station using the step-by-step obtained ToA (i.e., ToA1 and ToA2). Alternatively, the mobile station can obtain the position information using the distance value calculated by the two steps. And, the mobile station can obtain final position information using the position information obtained from each of the steps.

In the above description, the respective values are usable to apply various methods for an average, RMS (root mean square), LS (least square) and the like. In the present specification, a compensation method using the obtained values is not mentioned. Moreover, more reference values for the location estimation can be obtained by repeating the above-mentioned processes for more accurate measurements. And, more accurate position information can be obtained using the obtained values.

AP Based Step-by-Step Location Estimating Method

AP based step-by-step location estimating method can be categorized into a device initiation AP based step-by-step location estimating method and an AP initiation AP based step-by-step location estimating method. In the following description, the two kinds of the AP based step-by-step location estimating methods are explained with reference to the accompanying drawings.

1. Device Initiation AP Based Step-by-Step Location Estimating Method

Figure 5:
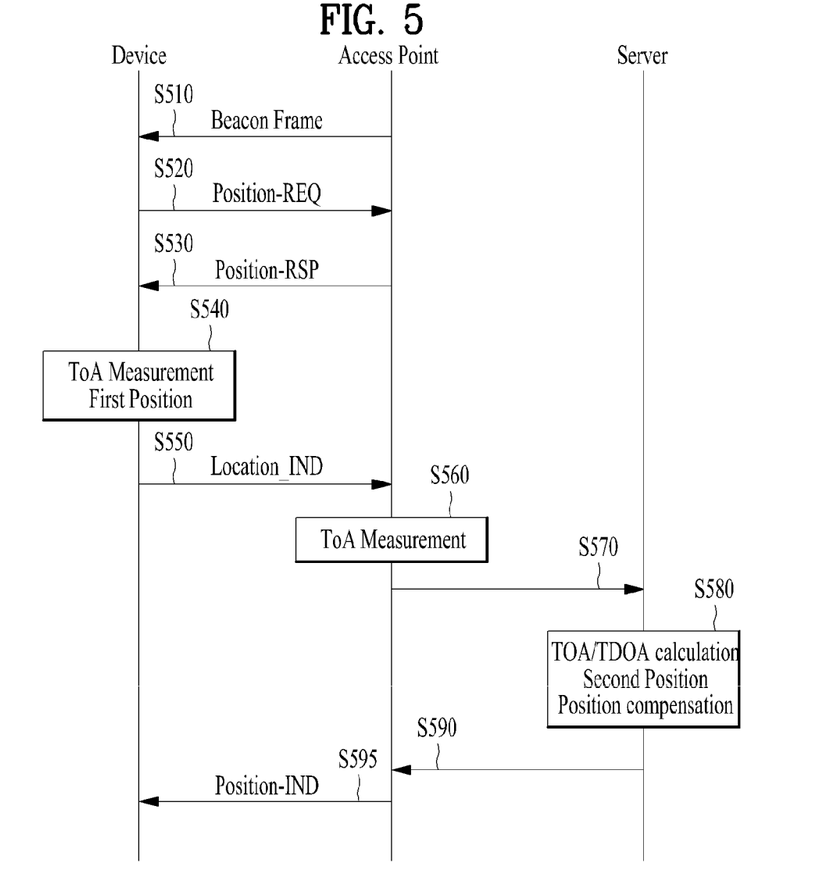
FIG. 5 is a diagram for one example to describe a Device initiation AP (access point) based step-by-step location estimating method.

FIG. 5 is a diagram for one example to describe a device initiation AP (access point) based step-by-step location estimating method.

Referring to FIG. 5, like the mobile station (device) based step-by-step location estimating method mentioned in the foregoing description, a mobile station receives a beacon frame from an AP and then matches a synchronization with the AP using the received beacon frame [S510]. Having matched the synchronization with the AP, the mobile station used the following method to estimate a location.

According to the device initiation AP based step-by-step location estimating method, the mobile station transmits a position-request signal (e.g., position_REQ frame/signal) to the AP [S520]. In particular, the mobile station transmits a position-request signal to the AP to obtain position information. In this case, the transmitted position-request message can include a position request indicator, a mobile station (device) ID and the like. And, the position-request signal is transmitted to APs by the mobile station. And, the position-request signal can be transmitted in a manner of containing such information as a time offset (e.g., a time offset between the mobile station and the AP) obtained from a beacon, neighbor AP information and the like.

Having received the position-request signal transmitted by the mobile station, the AP transmits a position-response signal (e.g., position_RSP signal/frame) to the mobile station in response to the position-request signal [S530]. In doing so, the position-response signal can be transmitted in a manner of containing ToD, mobile station (device) ID/SSID and the like. If such information as the time offset, the neighbor AP information and the like is not transmitted via the position request, it can be transmitted in a manner of being carried on the position-response signal [S530].

Having received the position-response signal from the AP, the mobile station can calculate a $1^{st}$ position from the received ToD [S540]. In particular, the mobile station can calculate ToA, a distance between the mobile station and the AP, a $1^{st}$ position and the like from the $1^{st}$ position [S540].

The mobile station transmits the $1^{st}$ position information (or a $1^{st}$ positioning information) and the ToD (departure time of a location indication signal) obtained by the $1^{st}$ location estimation to the AP via the location indication signal (e.g., location_indication signal/frame) and the like [S550]. In this case, the location indication signal (e.g., location_indication signal/frame) is transmitted by broadcasting. In the above description, the position request (position-REQ) and the position response (position-RSP) can be transmitted using probe-REQ and probe-RSP in IEEE 802.11 standard, respectively.

Having received the $1^{st}$ positioning information from the mobile station, the AP can operate in one of the former two cases (case 1 and case 2) mentioned in the foregoing description of the mobile station (device) based step-by-step location estimating method. And, the mobile station can obtain position information by performing TDOA on each of the two cases.

Case 1

First of all, the AP estimates ToA based on the location indication information received from the mobile station [S560]. Subsequently, the AP can transmit the estimated ToA information to such an upper layer as a location server/gateway [S570]. In particular, the AP can transmit a distance information calculated on the basis of the measured ToA to the upper location server or gateway [S570].

The LCSR (location server) or gateway calculates a $2^{nd}$ position of the mobile station by calculating ToA and TDOA based on the received ToA and is then able to perform a position compensation suing the received $1^{st}$ position information and the calculated $2^{nd}$ position information [S580]. This calculation can be named a $2^{nd}$ position measurement. Subsequently, the location server transmits the measured position information to a serving AP (e.g., the AP shown in FIG. 5) or may transmit the position information obtained from the calculated $2^{nd}$ position information to the serving AP [S690]. If so, the AP transmits a final position information received from the location server to the mobile station or may deliver a final position information obtained from performing the position compensation using the received $2^{nd}$ position information or the $1^{st}$ position information to the mobile station via a position indication (Position-IND) signal and the like [S595].

Case 2

Like the above-described case 1, the AP having measured the ToA/TDoA performs a $2^{nd}$ location estimation in a manner of calculating a distance between the AP and the mobile station using the measured ToA/TDoA informations or performing a location estimation using a found distance. In doing so, each of other APs (i.e., neighbor APs) having received a signal from the mobile station transmits ToA to the serving AP or transmits a result value of the $1^{st}$ step location estimation to the serving AP.

Figure 6:
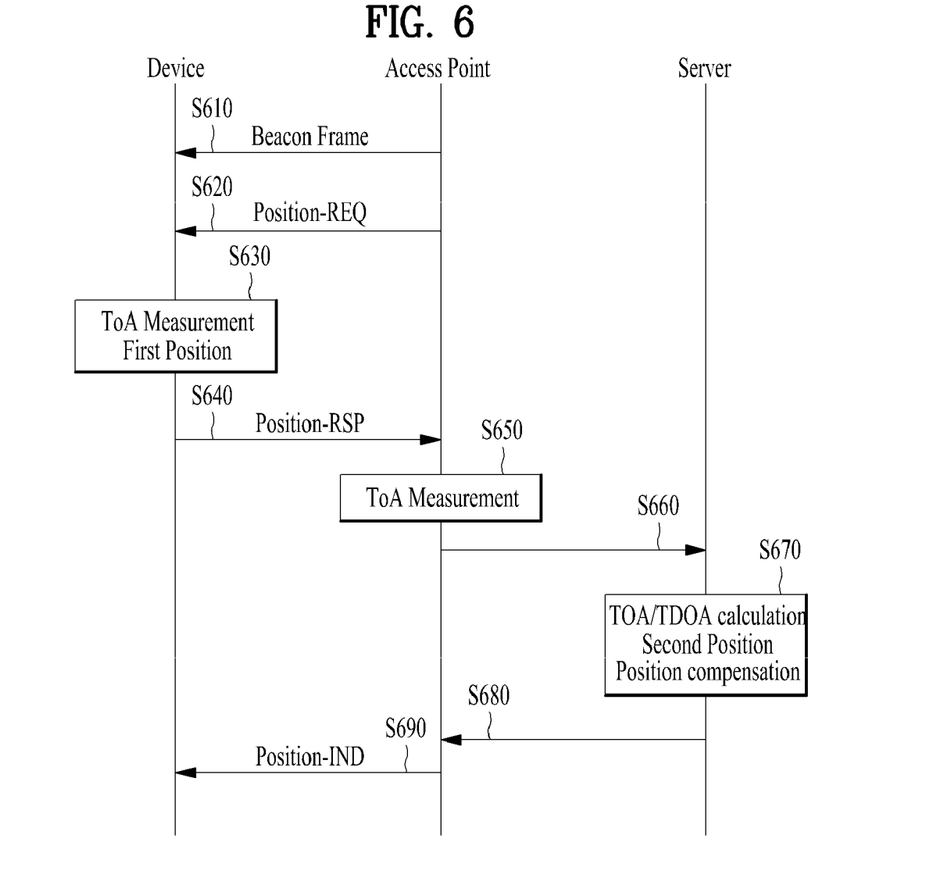
FIG. 6 is a diagram for one example to describe an AP (access point) initiation AP based step-by-step location estimating method.

FIG. 6 is a diagram for one example to describe an AP (access point) initiation AP based step-by-step location estimating method.

Referring to FIG. 6, a mobile station (device) receives a beacon frame transmitted from an AP and then synchronizes with the AP [S610]. According to the AP initiation AP based step-by-step location estimating method, after the synchronization between the mobile station and the AP has been established, the AP transmits a position request (Position_REQ) signal to the mobile station [S620]. The position request (Position_REQ) transmitted by the AP can be transmitted in a manner of containing such information as ToD, a position request indicator, SSID and the like.

Having received the position request signal (Position_REQ signal/frame) from the AP, the mobile station measures ToA based on the received ToD [S630]. Based on the measured ToA, the mobile station can obtain a distance from the AP, its position information and the like by perform a $1^{st}$ location estimation [S630]. Subsequently, the mobile station can transmit the informations obtained from the $1^{st}$ position measurement to the AP via a position response signal (e.g., position-RSP) [S640]. In this case, the information transmitted to the AP via the position response signal can include the ToA value (ToA1) calculated by the mobile station in the step S630, ToD, a distance (Distance1) between the mobile station and the AP, position information of the mobile station (position_info1), a mobile station (device) ID and the like.

Having received the $1^{st}$ location estimation information via the position response signal from the mobile station, the AP can obtain position information by performing a $2^{nd}$ location estimation in the manner of Case 1 or Case 2 mentioned in the former description of the mobile station (device) based step-by-step location estimating method.

Case 1

First of all, the AP estimates ToA based on the position response signal received from the mobile station [S650]. Subsequently, the AP can transmit the estimated ToA information to such an upper layer as a location server/gateway [S660]. In particular, the AP can transmit distance information calculated on the basis of the measured ToA to the upper location server or gateway [S660].

The LCSR (location server) or gateway calculates a $2^{nd}$ position of the mobile station by calculating ToA and TDOA based on the received ToA and is then able to perform a position compensation suing the received $1^{st}$ location estimation information and the $2^{nd}$ location estimation information [S670]. This calculation can be named a $2^{nd}$ position measurement. Subsequently, the location server transmits the measured position information to a serving AP (e.g., the AP shown in FIG. 6) or may transmit the calculated $2^{nd}$ position information to the serving AP [S680]. If so, the AP delivers a position information obtained from the location estimation using the $2^{nd}$ position information received from the location server and the $1^{st}$ position information to the mobile station via a position indication (Position-IND) signal and the like or may deliver the position information received from the location server via the position information signal [S690].

Case 2

Having received the position response signal from the mobile station, the AP measures ToA/TDoA using the ToD information included in the position response signal and the performs a $2^{nd}$ location estimation in a manner of calculating a distance between the AP and the mobile station using the measured ToA/TDoA or performing a location estimation using a found distance. In doing so, each of other APs (i.e., neighbor APs) having received a signal from the mobile station transmits ToA to the serving AP or transmits a result value of the $1^{st}$ step location estimation to the serving AP. The AP can estimate an accurate location of the mobile station using the position information obtained from the $2^{nd}$ location estimation and the $1^{st}$ position information.

In the above description, the respective values are usable to apply various methods for an average, RMS (root mean square), LS (least square) and the like. In the present specification, a compensation method using the obtained values is not mentioned. Moreover, more reference values for the location estimation can be obtained by repeating the above-mentioned processes for more accurate measurements. And, more accurate position information can be obtained using the obtained values.

If a mobile station, which uses WLAN, has a time stamp or clock, if the mobile station transmits a frame/signal, it can measure or obtain a departure time c through the time stamp/clock of its own. As ToA, distance and position are calculated step by step for location estimation, influence caused by a channel between the mobile station and the AP can be reduced. Hence, a position can be measured more accurately. Moreover, as states (e.g., LOS, NLOS, etc.) of the channel between the mobile station and the AP are identified using a $1^{st}$ position measurement information and a $2^{nd}$ position measurement information, accuracy of the position measurement can be enhanced.

According to the embodiments of the present invention mentioned in the foregoing description, a mobile station suing WLAN transmits time information via a frame and signal transceived between an AP and the mobile station to estimate position information, whereby location estimation accuracy of the mobile station can be increased by accurate ToA information estimation and repetitive measurements.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of estimating a location of a mobile station in a wireless LAN (local area network), the method comprising:

matching a time synchronization with a AP (access point) based on a beacon frame, including time stamp information, received from the AP;

obtaining time offset information between the AP and two neighbor APs located nearby the AP based on beacon frames received from each of the two neighbor APs;

transmitting a position request signal including departure time information of the position request signal and an identifier of the mobile station to the AP by synchronizing with the AP;

receiving, from the AP in response to the position request signal, a position response signal including a first location of the mobile station and a first distance between the mobile station and the AP and departure time information of the position response signal;

calculating a ToA (time of arrival) of a signal between the mobile station and the AP based on a received time point of the position response signal and the received departure time information of the position response signal, wherein the ToA represents a time period;

calculating each of a second distance between the mobile station and the AP and a second location of the mobile station using the calculated ToA; and determining a final location of the mobile station by compensating the first distance and the first location with the second distance and the second location, wherein the second distance is calculated by multiplexing the calculated ToA with a propagation velocity of the signal between the mobile station and the AP, the propagation velocity being a value known to the mobile station, and wherein the second location is calculated by using three ToAs including the calculated ToA and ToAs of each of the two neighbor APs.

2. The method of claim 1, wherein the position request signal further includes at least one of a position request indicator, a time offset information and neighbor AP information.

3. The method of claim 1, wherein the position request signal corresponds to a probe-request message type and wherein the position response signal corresponds to a probe-response message type.

4. The method of claim 1, wherein the first location of the mobile station and the first distance between the mobile station and the AP are calculated by a location server or a gateway.

5. The method of claim 4, wherein the first location of the mobile station and the first distance between the mobile station and the AP are calculated using a ToA value measured by the AP based on the position request signal of the mobile station.

6. A method of estimating a location of a mobile station in a wireless LAN (local area network), the method comprising:

matching a time synchronization with a AP (access point) based on a beacon frame, including time stamp information, received from the AP;

obtaining time offset information between the AP and two neighbor APs located nearby the AP based on beacon frames received from each of the two neighbor APs;

receiving a position request signal from the AP after synchronizing with the AP;

calculating a ToA (time of arrival) of a signal between the mobile station and the AP based on a received time point of the position request signal and a departure time included in the position request signal, wherein the ToA represents a time period;

calculating each of a first location of the mobile station and a first distance between the mobile station and the AP based on the calculated ToA;

transmitting, to the AP, a position response signal including the calculated ToA, the first location of the mobile station, the first distance, and a departure time information of the position response signal; and receiving, from the AP, second position information including a second location of the mobile station, wherein the first distance is calculated by multiplexing the calculated ToA with a propagation velocity of the signal between the mobile station and the AP, the propagation velocity being a value known to the mobile station, and wherein the first location is calculated by using three ToAs including the calculated ToA and ToAs of each of the two neighbor APs.

7. The method of claim 6, wherein the second location of the mobile station is calculated by a location server or a gateway.

8. The method of claim 7, wherein the second location of the mobile station is calculated using the ToA re-calculated by the AP based on the calculated ToA.

9. A method of estimating a location of a mobile station in a wireless LAN (local area network), the method comprising:

matching a time synchronization with a AP (access point) based on a beacon frame, including time stamp information, received from the AP;

obtaining time offset information between the AP and two neighbor APs located nearby the AP based on beacon frames received from each of the two neighbor APs;

transmitting a position request signal to the AP after synchronizing with the AP;

receiving, from the AP in response to the position request signal, a position response signal including a departure time information of the position response signal;

calculating a ToA (time of arrival) of a signal between the mobile station and the AP based on a received time point of the position response signal and a departure time of the position response signal, wherein the ToA represents a time period;

calculating each of a first location of the mobile station and a first distance between the mobile station and the AP based on the calculated ToA;

transmitting, to the AP, first position information including the calculated ToA and at least one the first location of the mobile station or the first distance; and receiving, from the AP, second position information including a second location of the mobile station, wherein the second distance is calculated by multiplexing the calculated ToA with a propagation velocity of the signal between the mobile station and the AP, the propagation velocity being a value known to the mobile station, and wherein the second location is calculated by using three ToAs including the calculated ToA and ToAs of each of the two neighbor APs.

10. The method of claim 9, wherein the second location of the mobile station is calculated by a location server or a gateway.

11. The method of claim 10, wherein the second location of the mobile station is calculated using the ToA re-calculated by the AP based on the calculated ToA.

12. A mobile station of estimating a location in a wireless LAN (local area network), the mobile station comprising:

a transmitter;

a receiver; and a processor operatively connected to the transmitter and the receiver, the processor configured to:

match a time synchronization with a AP (access point) based on a beacon frame, including time stamp information, received from the AP;

obtain time offset information between the AP and two neighbor APs located nearby the AP based on beacon frames received from each of the two neighbor APs;

transmit, to the AP, a position request signal including departure time information of the position request signal and an identifier of the mobile station by synchronizing with the AP;

receive, from the AP in response to the position request signal, a position response signal including a first location of the mobile station and a first distance between the mobile station and the AP and departure time information of the position response signal;

calculate a ToA (time of arrival) of a signal between the mobile station and the AP based on a received time point of the position response signal and the received departure time information of the position response signal, wherein the ToA represents a time period;

calculate each of a second distance between the mobile station and the AP and a second location of the mobile station using the calculated ToA; and determine a final location of the mobile station by compensating the first distance and the first location with the second distance and the second location, wherein the second distance is calculated by multiplexing the calculated ToA with a propagation velocity of the signal between the mobile station and the AP, the propagation velocity being a value known to the mobile station, and wherein the second location is calculated by using three ToAs including the calculated ToA and ToAs of each of the two neighbor APs.

13. A mobile station of estimating a location in a wireless LAN (local area network), the mobile station comprising:

a transmitter;

a receiver; and a processor operatively connected to the transmitter and the receiver, the processor configured to:

match a time synchronization with a AP (access point) based on a beacon frame, including time stamp information, received from the AP;

obtain time offset information between the AP and two neighbor APs located nearby the AP based on beacon frames received from each of the two neighbor APs;

receive a position request signal from the AP after synchronizing with the AP;

calculate a ToA (time of arrival) of a signal between the mobile station and the AP based on a received time point of the position request signal and a departure time included in the position request signal, wherein the ToA represents a time period;

calculate each of a first location of the mobile station and a first distance between the mobile station and the AP based on the calculated ToA;

transmit, to the AP, a position response signal including the calculated ToA, the first location of the mobile station, the first distance, and a departure time information of the position response signal; and receive, from the AP, second position information including a second location of the mobile station, wherein the first distance is calculated by multiplexing the calculated ToA with a propagation velocity of the signal between the mobile station and the AP, the propagation velocity being a value known to the mobile station, and wherein the first location is calculated by using three ToAs including the calculated ToA and ToAs of each of the two neighbor APs.

14. A mobile station of estimating a location in a wireless LAN (local area network), the mobile station comprising:

a transmitter;

a receiver; and a processor operatively connected to the transmitter and the receiver, the processor configured to:

match a time synchronization with a AP (access point) based on a beacon frame, including time stamp information, received from the AP;

obtain time offset information between the AP and two neighbor APs located nearby the AP based on beacon frames received from each of the two neighbor APs;

transmit a position request signal to the AP after synchronizing with the AP;

receive, from the AP in response to the position request signal, a position response signal including a departure time information of the position response signal;

calculate a ToA (time of arrival) of a signal between the mobile station and the AP based on a received time point of the position response signal and a departure time of the position response signal, wherein the ToA represents a time period;

calculate each of a first location of the mobile station and a first distance between the mobile station and the AP based on the calculated ToA;

transmit, to the AP, first position information including the calculated ToA and at least one the first location of the mobile station or the first distance; and receive, from the AP, second position information including a second location of the mobile station, wherein the first distance is calculated by multiplexing the calculated ToA with a propagation velocity of the signal between the mobile station and the AP, the propagation velocity being a value known to the mobile station, and wherein the first location is calculated by using three ToAs including the calculated ToA and ToAs of each of the two neighbor APs.

* * * * *